(12) United States Patent
Toko et al.

(10) Patent No.: US 11,926,375 B2
(45) Date of Patent: Mar. 12, 2024

(54) STEERING CONTROL DEVICE

(71) Applicant: JTEKT CORPORATION, Osaka (JP)

(72) Inventors: Takahiro Toko, Takahama (JP);
Nobuaki Kataoka, Okazaki (JP);
Takafumi Yamaguchi, Kuwana (JP);
Yukinobu Ezaki, Kasugai (JP)

(73) Assignee: JTEKT CORPORATION, Osaka (JP)

( * ) Notice: Subject to any disclaimer, the term of this patent is extended or adjusted under 35 U.S.C. 154(b) by 380 days.

(21) Appl. No.: 17/024,918

(22) Filed: Sep. 18, 2020

(65) Prior Publication Data
US 2021/0094609 A1    Apr. 1, 2021

(30) Foreign Application Priority Data

Sep. 26, 2019   (JP) .................................. 2019-175767

(51) Int. Cl.
*B62D 5/04*   (2006.01)
*B62D 15/02*  (2006.01)

(52) U.S. Cl.
CPC ......... *B62D 5/0469* (2013.01); *B62D 5/0481* (2013.01); *B62D 15/021* (2013.01); *B62D 5/0409* (2013.01)

(58) Field of Classification Search
CPC .. B62D 5/0469; B62D 5/0481; B62D 15/021; B62D 5/0409; B62D 5/04
See application file for complete search history.

(56) References Cited

U.S. PATENT DOCUMENTS

| | | | |
|---|---|---|---|
| 2013/0238196 A1 | 9/2013 | Seto et al. | |
| 2018/0057043 A1* | 3/2018 | Toko ........................ | B62D 3/12 |
| 2018/0079448 A1* | 3/2018 | Kodera .................. | B62D 6/008 |
| 2018/0346018 A1 | 12/2018 | Kataoka et al. | |
| 2020/0114961 A1* | 4/2020 | Suzuki ..................... | B60Q 9/00 |

FOREIGN PATENT DOCUMENTS

| | | | |
|---|---|---|---|
| JP | 2016-155519 A | | 9/2016 |
| JP | 2017210216 A | * | 11/2017 |
| JP | 2017210216 A | * | 11/2017 |
| JP | 2019-104476 A | | 6/2019 |

OTHER PUBLICATIONS

Feb. 15, 2021 Search Report issued in European Patent Application No. 20197791.5.

* cited by examiner

*Primary Examiner* — Ig T An
(74) *Attorney, Agent, or Firm* — Oliff PLC

(57) ABSTRACT

A steering control device includes an electronic control unit. The electronic control unit is configured to acquire a limit position determination angle corresponding to an absolute steering angle when it is determined that movement of a turning shaft is limited, to compare a first stroke width which is a sum of an absolute value of the limit position determination angle on a right side and an absolute value of the limit position determination angle on a left side with a stroke threshold value corresponding to an entire stroke range of the turning shaft when the limit position determination angles on the right and left sides are acquired, and to set end-position-corresponding angles on the right and left sides based on the limit position determination angles on the right and left sides when the first stroke width is greater than the stroke threshold value.

5 Claims, 5 Drawing Sheets

STEERING CONTROL DEVICE

CROSS-REFERENCE TO RELATED APPLICATION

This application claims priority to Japanese Patent Application No. 2019-175767 filed on Sep. 26, 2019, incorporated herein by reference in its entirety.

BACKGROUND

1. Technical Field

The disclosure relates to a steering control device.

2. Description of Related Art

In the related art, an electric power steering system (EPS) including an actuator with a motor as a drive source is known as a vehicular steering system. As such an EPS, there is an EPS that acquires a steering angle of a steering wheel as an absolute angle including a range exceeding 360° and performs various types of control based on the steering angle. As an example of such control, for example, Japanese Unexamined Patent Application Publication No. 2016-155519 (JP 2016-155519 A) discloses that end contact relaxation control for relaxing an impact of a so-called end contact in which a rack end which is an end of a rack shaft comes into contact with a rack housing is performed.

In the EPS described in JP 2016-155519 A, a rack end position at which movement of the rack shaft is physically limited by an end contact is correlated with a steering angle and the angle is set as an end-position-corresponding angle. In the EPS, an impact of an end contact is relaxed by decreasing a target value of a motor torque which is output from a motor based on a distance of the steering angle from the end-position-corresponding angle.

SUMMARY

Depending on specifications of a vehicle, the end-position-corresponding angle may be lost, for example, at the time of turning the ignition off or at the time of replacement of a battery. When the end-position-corresponding angle is lost in this way, for example, end contact relaxation control may not be performed. Therefore, when the end-position-corresponding angle has been lost, it is necessary to set the end-position-corresponding angle again. At this time, it is necessary to cause the end-position-corresponding angle to accurately correspond to an actual end angle at which an end contact occurs actually and to set the end-position-corresponding angle sooner.

The disclosure provides a steering control device that can set an end-position-corresponding angle which accurately corresponds to an actual end angle sooner.

According to an aspect of the disclosure, there is provided a steering control device for a steering system including a housing, a turning shaft which is accommodated in the housing such that the turning shaft is able to reciprocate, and an actuator which applies a motor torque for causing the turning shaft to reciprocate using a motor as a drive source, the steering control device including an electronic control unit. The electronic control unit is configured to detect an absolute steering angle which is a rotation angle of a rotation shaft which is able to be converted into a turning angle of turning wheels connected to the turning shaft and which is expressed as an absolute angle including a range exceeding 360°. The electronic control unit is configured to determine whether movement of the turning shaft is limited and acquire a limit position determination angle corresponding to the absolute steering angle when it is determined that movement of the turning shaft is limited. The electronic control unit is configured to compare a first stroke width which is a sum of an absolute value of the limit position determination angle on a right side and an absolute value of the limit position determination angle on a left side with a stroke threshold value corresponding to an entire stroke range of the turning shaft when an angle which indicates that the turning shaft is located at an end position and which is correlated with the absolute steering angle is defined as an end-position-corresponding angle and the limit position determination angles on the right and left sides are acquired, and to set the end-position-corresponding angles on the right and left sides based on the limit position determination angles on the right and left sides when the first stroke width is greater than the stroke threshold value.

For example, when movement of the turning shaft is limited due to contact of the turning wheels with a curbstone or the like, the absolute value of the limit position determination angle which is acquired at this time is less than the absolute value of the limit position determination angle which is acquired at the time of an end contact. Accordingly, when the limit position determination angle on at least one of the right and left sides is acquired, for example, at the time of contact with a curbstone, the first stroke width is equal to or less than the stroke threshold value. As a result, when the first stroke width is greater than the stroke threshold value, it is considered that the limit position determination angles on the right and left sides are acquired at the time of an end contact.

Taking this point into consideration, with the above-mentioned configuration, the first stroke width is compared with the stroke threshold value, and the end-position-corresponding angles on the right and left sides are set based on the limit position determination angles on the right and left sides which are used to calculate the first stroke width when the first stroke width is greater than the stroke threshold value. Accordingly, the set end-position-corresponding angles on the right and left sides accurately correspond to the actual end angle. When the limit position determination angles on the right and left sides are respectively acquired, the first stroke width can be calculated and thus it is possible to rapidly set the end-position-corresponding angles on the right and left sides without waiting until a plurality of limit position determination angles on the right and left sides is acquired.

In the steering control device according to the aspect, the electronic control unit may be configured to set the end-position-corresponding angle on only one side of the right and left sides based on a plurality of limit position determination angles on the one side when the plurality of limit position determination angles on only the one side is acquired.

With this configuration, even when only the limit position determination angle on one side is acquired, for example, depending on a traveling situation of the vehicle, it is possible to set the end-position-corresponding angle on the one side. In the above-mentioned configuration, when distances between the plurality of limit position determination angles on the one side and a vehicle center angle indicating the absolute steering angle at which a vehicle travels forward are defined as center separation angles, the electronic control unit may be configured to set only the end-position-corresponding angle on the one side based on the plurality of limit position determination angles on the one side when the center separation angles are greater than a preset end position determination threshold value.

When the center separation angles are greater than the end position determination threshold value, it is considered that a plurality of limit position determination angles on one side are angles close to an actual end angle. Accordingly, with the above-mentioned configuration, when the center separation angles are greater than the end position determination threshold value, it is possible to prevent the end-position-corresponding angle from being shifted from the actual end position by setting only the end-position-corresponding angle on the one side based on the plurality of limit position determination angles on the one side.

In the configuration, when the limit position determination angle on the other side of the right and left sides is acquired after only the end-position-corresponding angle on the one side has been set, the electronic control unit may be configured to compare a second stroke width which is a sum of an absolute value of a value based on the plurality of limit position determination angles on the one side and an absolute value of the limit position determination angle on the other side with the stroke threshold value and to set the end-position-corresponding angle on the other side based on the limit position determination angle on the other side when the second stroke width is greater than the stroke threshold value.

With this configuration, by comparing the second stroke width with the stroke threshold value, it is possible to rapidly set the end-position-corresponding angle on the other side which accurately corresponds to the actual end angle without waiting until a plurality of limit position determination angles on the other side is acquired.

In the configuration, when the limit position determination angle on the other side of the right and left sides is acquired after only the end-position-corresponding angle on the one side has been set, the electronic control unit may be configured to compare a second stroke width which is a sum of an absolute value of a value based on the plurality of limit position determination angles on the one side and an absolute value of the limit position determination angle on the other side with the stroke threshold value and to discard the end-position-corresponding angle on the one side when the second stroke width is equal to or less than the stroke threshold value.

When the second stroke width is equal to or less than the stroke threshold value, there is a likelihood that the set end-position-corresponding angle on one side will have been greatly separated from an actual end angle. Accordingly, with this configuration, by discarding the end-position-corresponding angle on the one side when the second stroke width is equal to or less than the stroke threshold value, it is possible to set an end-position-corresponding angle again and to set an end-position-corresponding angle which accurately corresponds to an actual end angle.

According to the aspect, it is possible to set an end-position-corresponding angle which accurately corresponds to an actual end angle sooner.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
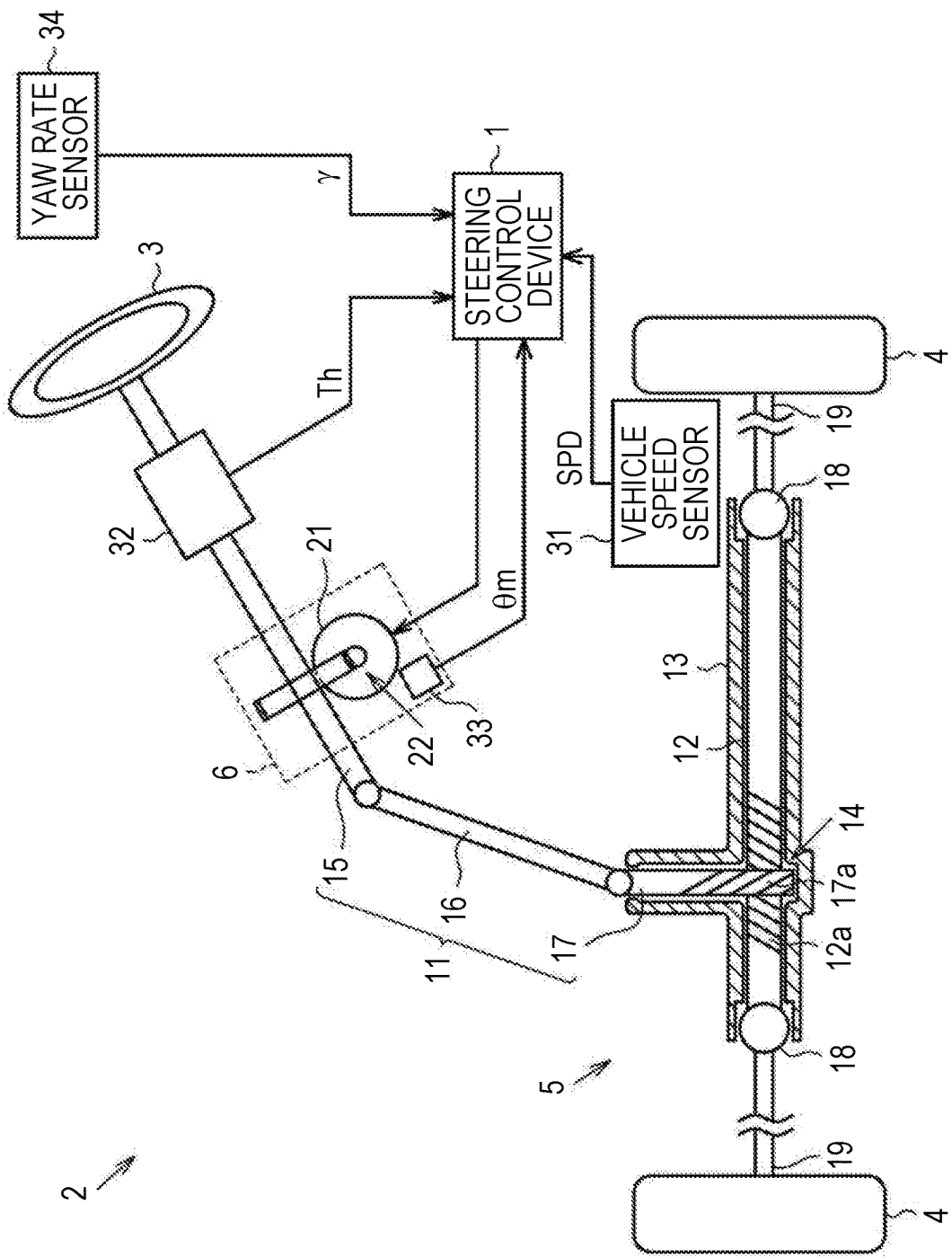
FIG. 1 is a diagram schematically illustrating a configuration of an electric power steering system.

Hereinafter, a steering control device according to an embodiment of the disclosure will be described with reference to the accompanying drawings. As illustrated in FIG. 1, an electric power steering device (EPS) 2 which is a steering device to be controlled by a steering control device 1 includes a steering mechanism 5 that turns turning wheels 4 based on a driver's operation of a steering wheel 3. The EPS 2 further includes an EPS actuator 6 which is an actuator that applies an assist force for assisting a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing into which the rack shaft 12 is inserted such that it can reciprocate, and a rack and pinion mechanism 14 that converts a rotational motion of the steering shaft 11 to a translational motion of the rack shaft 12. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12a formed on the rack shaft 12 and pinion teeth 17a formed on the pinion shaft 17 engage with each other. Tie rods 19 are rotatably connected to both ends of the rack shaft 12 via rack ends 18 of which each is formed of a ball joint provided at one shaft end. The tips of the tie rods 19 are connected to knuckles (not illustrated) to which the turning wheels 4 are assembled. Accordingly, in the EPS 2, a rotational motion of the steering shaft 11 based on a steering operation is converted to a translational motion in an axial direction of the rack shaft 12 by the rack and pinion mechanism 14 and the translational motion in the axial direction is transmitted to the knuckles via the tie rods 19, whereby a turning angle of the turning wheels 4, that is, a travel direction of a vehicle, is changed.

A position of the rack shaft 12 at which the rack end 18 comes into contact with the left end of the rack housing 13 is a position at which the steering wheel 3 can be maximally steered to the right side, and this position corresponds to a rack end position which is a right end position. A position of the rack shaft 12 at which the rack end 18 comes into contact with the right end of the rack housing 13 is a position at which the steering wheel 3 can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing rotation of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls the operation thereof. The steering control device 1 includes an electronic control unit (ECU). The ECU includes a central processing unit (CPU) and a memory which are not illustrated and the CPU executes a program stored in the memory every predetermined calculation cycle. Accordingly, various types of control are performed.

A vehicle speed sensor 31 that detects a vehicle speed SPD of the vehicle and a torque sensor 32 that detects a steering torque Th which is applied to the steering shaft 11 according to a driver's steering are connected to the steering control device 1. A rotation sensor 33 that detects a rotation angle θm of the motor 21 as a relative angle in a range of 360° is connected to the steering control device 1. For example, the steering torque Th and the rotation angle θm are detected as positive values when the steering wheel 3 is steered to the right side and are detected as negative values when the steering wheel 3 is steered to the left side. A yaw rate sensor 34 that detects a yaw rate γ of the vehicle is connected to the steering control device 1. The steering control device 1 controls the operation of the EPS actuator 6, that is, an assist force which is applied to the steering mechanism 5 such that the rack shaft 12 can move to reciprocate, by supplying drive power to the motor 21 based on signals indicating state quantities which are input from the sensors.

Figure 2:
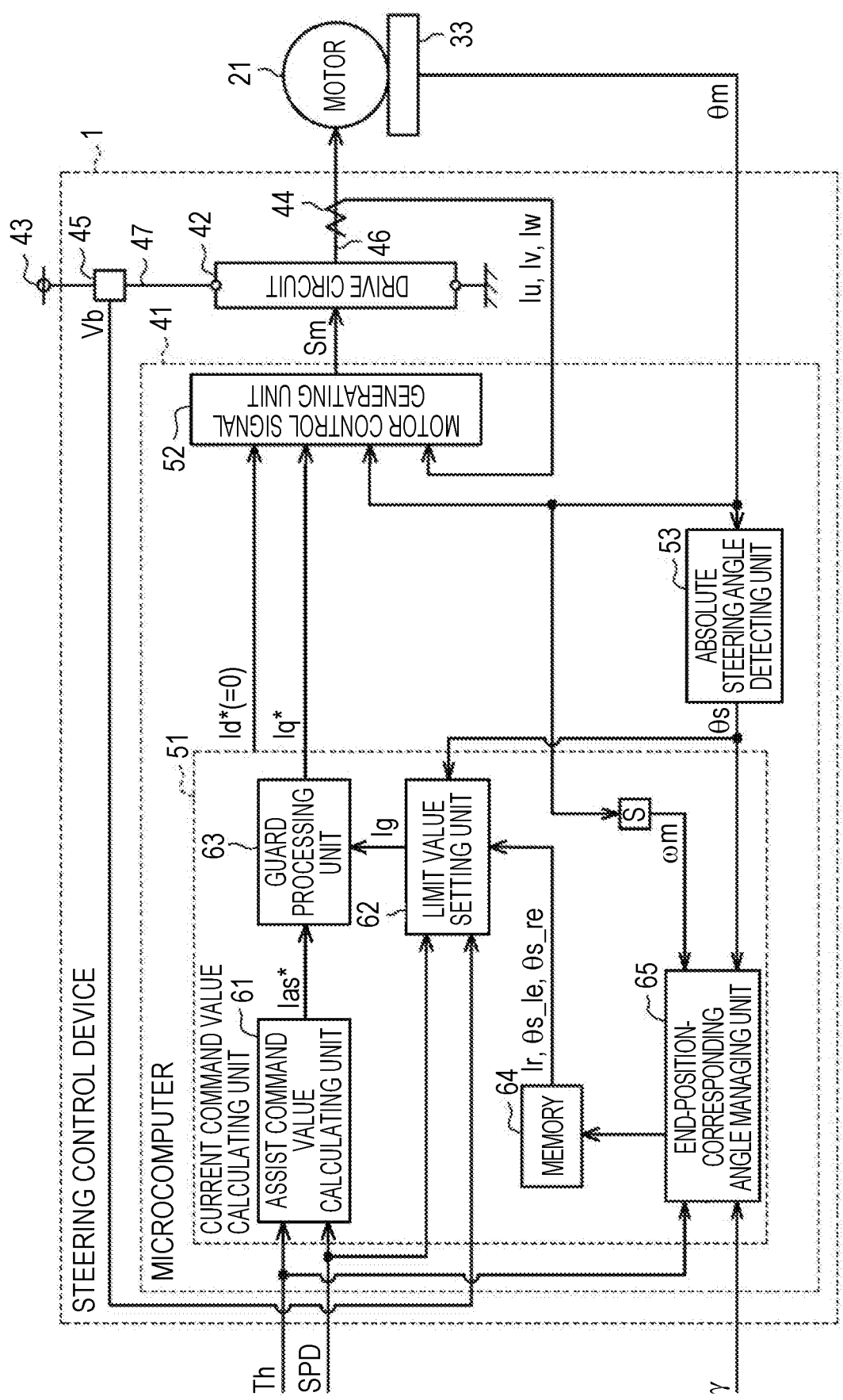
FIG. 2 is a block diagram illustrating a steering control device.

The configuration of the steering control device 1 will be described below. As illustrated in FIG. 2, the steering control device 1 includes a microcomputer 41 that outputs a motor control signal Sm and a drive circuit 42 that supplies drive power to the motor 21 based on the motor control signal Sm. A known PWM inverter including a plurality of switching elements such as FETs is employed as the drive circuit 42 according to this embodiment. The motor control signal Sm which is output from the microcomputer 41 defines ON and OFF states of the switching elements. Accordingly, the switching elements are turned on and off in response to the motor control signal Sm and a power supply pattern to a motor coil of each phase is switched in phases, whereby DC power of an onboard power supply 43 is converted into three-phase drive power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, the rotation angle θm of the motor 21, and the yaw rate γ are input to the microcomputer 41. Phase current values Iu, Iv, and Iw of the motor 21 which are detected by a current sensor 44 and a source voltage Vb of the onboard power supply 43 which is detected by a voltage sensor 45 are also input to the microcomputer 41. The current sensor 44 is provided in a connection line 46 between the drive circuit 42 and the motor coil of each phase. The voltage sensor 45 is provided in a connection line 47 between the onboard power supply 43 and the drive circuit 42. In FIG. 2, for the purpose of convenience of description, one group of each of the current sensors 44 of the phases and each of the connection lines 46 of the phases is illustrated. The microcomputer 41 outputs a motor control signal Sm based on the input state quantities.

Specifically, the microcomputer 41 includes a current command value calculating unit 51 that calculates current command values Id* and Iq*, a motor control signal generating unit 52 that outputs a motor control signal Sm based on the current command values Id* and Iq*, and an absolute steering angle detecting unit 53 that detects an absolute steering angle θs.

The steering torque Th, the vehicle speed SPD, the yaw rate γ, and the absolute steering angle θs are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted with and have negative values when steering to the left side is assisted with.

The current command values Id* and Iq*, the phase current values Iu, Iv, and Iw, and the rotation angle θm of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle θm. Then, the motor control signal generating unit 52 generates the motor control signal Sm by performing current feedback control such that the d-axis current value Id follows the d-axis current command value Id* and the q-axis current value Iq follows the q-axis current command value Iq*.

The motor control signal generating unit 52 outputs the generated motor control signal Sm to the drive circuit 42. Accordingly, drive power based on the motor control signal Sm is supplied to the motor 21 and a motor torque based on the q-axis current command value Iq* is output from the motor 21, whereby an assist force is applied to the steering mechanism 5.

The rotation angle θm is input to the absolute steering angle detecting unit 53. The absolute steering angle detecting unit 53 detects an absolute motor angle which is expressed as an absolute angle including a range exceeding 360° based on the rotation angle θm. The absolute steering angle detecting unit 53 in this embodiment integrates a rotation speed of the motor 21, for example, with an origin at the rotation angle θm when a start switch such as an ignition switch is turned on for the first time after the onboard power supply 43 has been replaced, and detects an absolute motor angle based on the integrated rotation speed and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, rotation of the motor 21 is monitored even when the start switch is turned off, and the rotation speed of the motor 21 is integrated normally. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotation of the steering shaft 11 as described above, the absolute steering angle θs indicates a rotation angle of a rotation shaft which can be converted to the turning angle of the turning wheels 4. For example, the absolute motor angle and the absolute steering angle θs have positive values when they are angles turned to the right side from the origin and have negative values when they are angles turned to the left side from the origin.

The configuration of the current command value calculating unit 51 will be described below in detail. The current command value calculating unit 51 includes an assist command value calculating unit 61 that calculates an assist command value Ias* which is a base component of the q-axis current command value Iq*, a limit value setting unit 62 that sets a limit value Ig which is an upper limit of the absolute value of the q-axis current command value Iq*, and a guard processing unit 63 that limits the absolute value of the assist command value Ias* to being equal to or less than the limit value Ig. The current command value calculating unit 51 further includes an end-position-corresponding angle managing unit 65 that manages end-position-corresponding angles θs_re and θs_le which are the absolute steering angles θs corresponding to right and left rack end positions and which are stored in a memory 64.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* to have a larger absolute value as the absolute value of the steering torque Th becomes greater and as the vehicle speed SPD becomes lower. The calculated assist command value Ias* is output to the guard processing unit 63.

The limit value Ig set by the limit value setting unit 62 in addition to the assist command value Ias* is input to the guard processing unit 63 as will be described later. When the absolute value of the input assist command value Ias* is equal to or less than the limit value Ig, the guard processing unit 63 outputs the value of the assist command value Ias* to the motor control signal generating unit 52 as the q-axis current command value Iq* without any change. On the other hand, when the absolute value of the input assist command value Ias* is greater than the limit value Ig, the guard processing unit 63 outputs a value obtained by limiting the absolute value of the assist command value Ias* to the limit value Ig to the motor control signal generating unit 52 as the q-axis current command value Iq*.

The rated current Ir which is a maximum current corresponding to a torque set in advance as a motor torque which can be output from the motor 21, end-position-corresponding angles θs_re and θs_le, and the like are stored in the memory 64. The end-position-corresponding angle θs_le on the left side is the absolute steering angle θs corresponding to the left rack end position, and the end-position-corresponding angle θs_re on the right side is the absolute steering angle θs corresponding to the right rack end position. Setting of the end-position-corresponding angles θs_re and θs_le is managed by the end-position-corresponding angle managing unit 65 as will be described later. For example, a memory of a type that maintains the end-position-corresponding angles θs_re and θs_le as long as the onboard power supply 43 is not detached is used as the memory 64 in this embodiment.

The configuration of the limit value setting unit 62 will be described below. The absolute steering angle θs, the vehicle speed SPD, the source voltage Vb, the rated current Ir, and the end-position-corresponding angles θs_re and θs_le are input to the limit value setting unit 62. The limit value setting unit 62 sets the limit value Ig based on the input state quantities.

Figure 3:
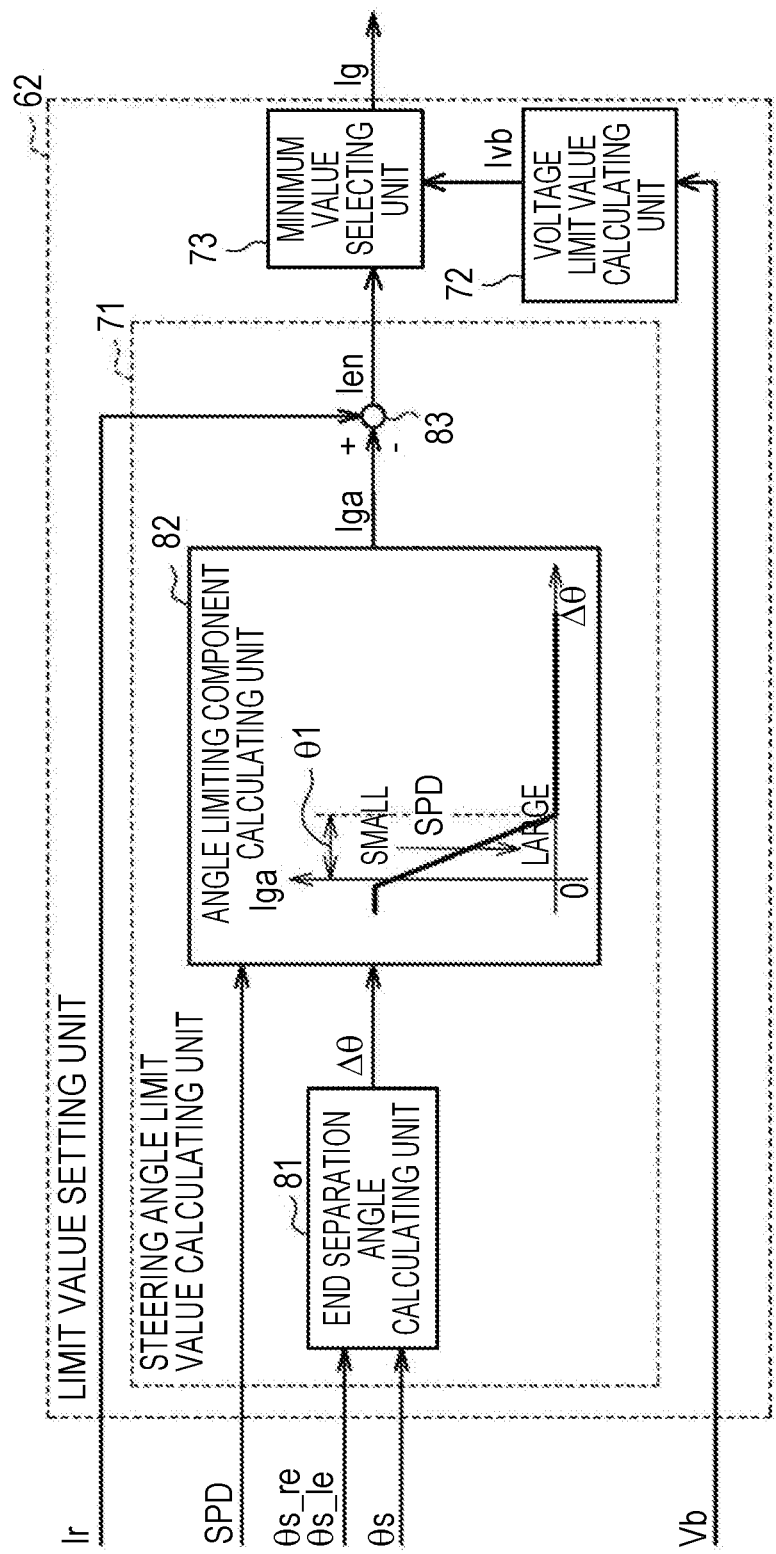
FIG. 3 is a block diagram illustrating a limit value setting unit.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ien and the voltage limit value Ivb.

The absolute steering angle θs, the vehicle speed SPD, the rated current Ir, and the end-position-corresponding angles θs_re and θs_le are input to the steering angle limit value calculating unit 71. The steering angle limit value calculating unit 71 calculates the steering angle limit value Ien which decreases with a decrease of an end separation angle Δθ indicating a minimum distance of the absolute steering angle θs from the end-position-corresponding angles θs_re and θs_le on the right and left sides based on the input state quantities when the end separation angle Δθ is equal to or less than a predetermined angle θ1 as will be described later. The calculated steering angle limit value Ien is output to the minimum value selecting unit 73. The steering angle limit value calculating unit 71 does not calculate the steering angle limit value Ien when none of the end-position-corresponding angles θs_re and θs_le on the right and left sides are set in the memory 64.

The source voltage Vb is input to the voltage limit value calculating unit 72. The voltage limit value calculating unit 72 calculates the voltage limit value Ivb less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having a decreasing absolute value with a decrease of the absolute value of the source voltage Vb. The calculated voltage limit value Ivb is output to the minimum value selecting unit 73.

The minimum value selecting unit 73 selects the smaller of the input steering angle limit value Ien and the input voltage limit value Ivb as the limit value Ig and outputs the selected one to the guard processing unit 63. When the steering angle limit value Ien is output as the limit value Ig to the guard processing unit 63, the absolute value of the q-axis current command value Iq* is limited to the steering angle limit value Ien. Accordingly, end contact relaxation control for relaxing an impact of an end contact in which the rack end 18 comes into contact with the rack housing 13 is performed by decreasing the absolute value of the q-axis current command value Iq* with the decrease of the end separation angle Δθ when the end separation angle Δθ is equal to or less than the predetermined angle θ1. As will be described later, regular end contact relaxation control is performed when both of the end-position-corresponding angles θs_re and θs_le on the right and left sides are stored in the memory 64, and temporary end contact relaxation control is performed when one of the end-position-corresponding angles θs_re and θs_le on the right and left sides is stored in the memory 64.

When the voltage limit value Ivb is output as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with the decrease of the absolute value of the source voltage Vb is performed.

The configuration of the steering angle limit value calculating unit 71 will be described below. The steering angle limit value calculating unit 71 includes an end separation angle calculating unit 81 that calculates the end separation angle Δθ and an angle limiting component calculating unit 82 that calculates an angle limiting component Iga which is a current limit which is determined based on the end separation angle Δθ. The steering angle limit value calculating unit 71 calculates the steering angle limit value Ien by subtracting the angle limiting component Iga from the rated current Ir.

Specifically, the absolute steering angle θs and the end-position-corresponding angles θs_re and θs_le are input to the end separation angle calculating unit 81. When both the end-position-corresponding angles θs_re and θs_le on the right and left sides are stored in the memory 64, the end separation angle calculating unit 81 calculates a difference between the absolute steering angle θs and the end-position-corresponding angle θs_le on the left side in the newest calculation cycle and a difference between the absolute steering angle θs and the end-position-corresponding angle θs_re on the right side in the newest calculation cycle. Then, the end separation angle calculating unit 81 outputs the smaller absolute value of the calculated differences as the end separation angle Δθ to the angle limiting component calculating unit 82. On the other hand, when only one of the end-position-corresponding angles θs_re and θs_le on the right and left sides is stored in the memory 64, the end separation angle calculating unit 81 calculates a difference between the absolute steering angle θs and the end-position-corresponding angle θs_le or the end-position-corresponding angle θs_re in the newest calculation cycle. Then, the end separation angle calculating unit 81 outputs the calculated difference as the end separation angle Δθ to the angle limiting component calculating unit 82.

The end separation angle calculating unit 81 does not calculate the end separation angle Δθ when none of the end-position-corresponding angles θs_re and θs_le on the right and left sides is stored in the memory 64. Accordingly, in the angle limiting component calculating unit 82 which will be described later, the angle limiting component Iga is not calculated and the steering angle limit value Ien is not calculated.

The end separation angle Δθ and the vehicle speed SPD are input to the angle limiting component calculating unit 82. The angle limiting component calculating unit 82 includes a map in which a relationship between the end separation angle Δθ and the vehicle speed SPD and the angle limiting component Iga is defined, and calculates the angle limiting component Iga corresponding to the end separation angle Δθ and the vehicle speed SPD with reference to the map.

In this map, the angle limiting component Iga is set to decrease as the end separation angle Δθ increases from a zero state, to reach zero when the end separation angle Δθ is a predetermined angle θ1, and to be zero when the end separation angle Δθ is greater than the predetermined angle θ1. In this map, an area in which the end separation angle Δθ is negative is also set, and the angle limiting component Iga increases in proportion to a decrease of the end separation angle Δθ when the end separation angle Δθ becomes less than zero and is kept constant after the end separation angle Δθ becomes the rated current Ir. The negative area in the map is assumed to be a degree by which the motor 21 rotates with elastic deformation of the EPS 2 by performing more turning steering in a state in which the rack end 18 comes into contact with the rack housing 13. The predetermined angle θ1 is set to a small angle indicating a range close to the end-position-corresponding angles θs_re and θs_le. That is, the angle limiting component Iga is set to decrease when the absolute steering angle θs transitions from the end-position-corresponding angles θs_re and θs_le to the neutral steering position and to be zero when the absolute steering angle θs is located closer to the neutral steering position than to the vicinities of the end-position-corresponding angles θs_re and θs_le.

In this map, the angle limiting component Iga is set to decrease with an increase of the vehicle speed SPD in an area in which the end separation angle Δθ is equal to or less than the predetermined angle θ1. Specifically, the angle limiting component Iga is set to be greater than zero when the vehicle speed SPD is in a low-speed area, and the angle limiting component Iga is set to be zero when the vehicle speed SPD is in a middle-speed or high-speed area. The calculated angle limiting component Iga is output to a subtractor 83.

The rated current Ir in addition to the angle limiting component Iga is input to the subtractor 83. The steering angle limit value calculating unit 71 outputs a value obtained by subtracting the angle limiting component Iga from the rated current Ir in the subtractor 83 as the steering angle limit value Ien to the minimum value selecting unit 73.

The configuration of the end-position-corresponding angle managing unit 65 will be described below. As illustrated in FIG. 2, the steering torque Th, the yaw rate γ, the absolute steering angle θs, and a motor angular velocity ωm obtained by differentiating the rotation angle θm are input to the end-position-corresponding angle managing unit 65. The end-position-corresponding angle managing unit 65 determines whether movement of the rack shaft 12 to one of the right and left sides has been limited based on the input state quantities, and acquires a plurality of limit position determination angles θi corresponding to the absolute steering angle θs when it is determined that movement of the rack shaft 12 has been limited. Then, the end-position-corresponding angle managing unit 65 stores the end-position-corresponding angles θs_re and θs_le based on the plurality of limit position determination angles θi in the memory 64. After the end-position-corresponding angles θs_re and θs_le have been stored in the memory 64 once, the end-position-corresponding angle managing unit 65 does not perform processes associated with setting of the end-position-corresponding angles θs_re and θs_le until they are lost.

Figure 4:
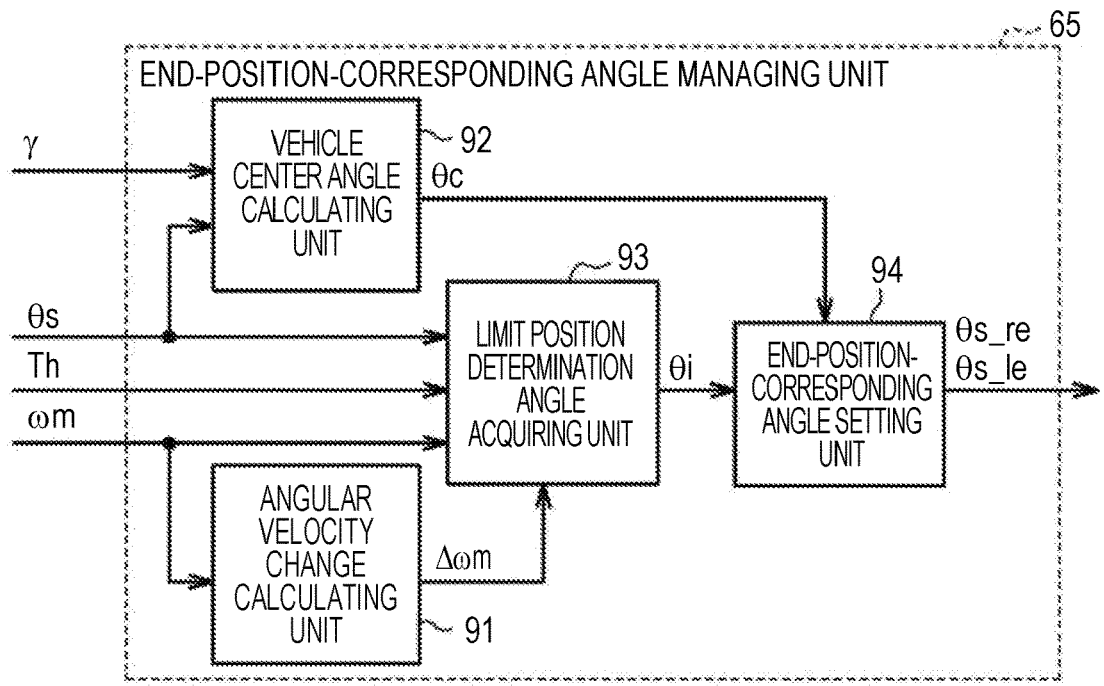
FIG. 4 is a block diagram illustrating an end-position-corresponding angle managing unit.

Specifically, as illustrated in FIG. 4, the end-position-corresponding angle managing unit 65 includes an angular velocity change calculating unit 91, a vehicle center angle calculating unit 92, a limit position determination angle acquiring unit 93, and an end-position-corresponding angle setting unit 94. The control blocks will be sequentially described below.

Angular Velocity Change Calculating Unit 91

A motor angular velocity $\omega m$ is input to the angular velocity change calculating unit 91. The angular velocity change calculating unit 91 calculates an angular velocity change $\Delta\omega m$ which is an amount of change of the motor angular velocity $\omega m$ based on the input motor angular velocity $\omega m$. Then, the angular velocity change calculating unit 91 outputs the angular velocity change $\Delta\omega m$ to the limit position determination angle acquiring unit 93. The angular velocity change calculating unit 91 in this embodiment outputs a value obtained by performing a low-pass filtering process on the angular velocity change $\Delta\omega m$ to the limit position determination angle acquiring unit 93.

Vehicle Center Angle Calculating Unit 92

The yaw rate $\gamma$ and the absolute steering angle $\theta s$ are input to the vehicle center angle calculating unit 92. The vehicle center angle calculating unit 92 calculates a vehicle center angle $\theta c$ which is the absolute steering angle $\theta s$ when the vehicle is traveling forward based on the input state quantities. Specifically, the vehicle center angle calculating unit 92 compares the yaw rate $\gamma$ with a yaw rate threshold value $\gamma th$ and determines that the vehicle is traveling forward when the yaw rate $\gamma$ is equal to or less than the yaw rate threshold value $\gamma th$. The vehicle center angle calculating unit 92 calculates the absolute steering angle $\theta s$ when it is determined that the vehicle is traveling forward as the vehicle center angle $\theta c$, and outputs the vehicle center angle $\theta c$ to the end-position-corresponding angle setting unit 94. The yaw rate threshold value $\gamma th$ is a yaw rate indicating that the vehicle is not turning and is set in advance to a value which is slightly greater than zero.

Limit Position Determination Angle Acquiring Unit 93

The steering torque Th, the motor angular velocity $\omega m$, the angular velocity change $\Delta\omega m$, and the absolute steering angle $\theta s$ are input to the limit position determination angle acquiring unit 93. The limit position determination angle acquiring unit 93 determines whether movement of the rack shaft 12 to one of the right and left sides has been limited based on the input state quantities, acquires the absolute steering angle $\theta s$ when it is determined that movement of the rack shaft 12 has been limited as a limit position determination angle $\theta i$, and outputs the acquired limit position determination angle $\theta i$ to the end-position-corresponding angle setting unit 94.

Specifically, when the following three conditions are satisfied, the limit position determination angle acquiring unit 93 determines that movement of the rack shaft 12 has been limited. (a1) The absolute value of the steering torque Th is equal to or greater than a steering torque threshold value Tth.

(a2) The sign of the motor angular velocity $\omega m$ is the same as the sign of the steering torque Th and the absolute value of the motor angular velocity $\omega m$ is greater than a first angular velocity threshold value $\omega th1$ and equal to or less than a second angular velocity threshold value $\omega th2$.

(a3) The absolute value of the angular velocity change $\Delta\omega m$ is less than an angular velocity change threshold value $\Delta\omega th$. The steering torque threshold value Tth is a steering torque which is required to hold the steering of the steering wheel 3 when the vehicle travels to turn in a state in which the rack end 18 is in contact with the rack housing 13 and is set to an appropriate value which is greater than zero. The first angular velocity threshold value $\omega th1$ is an angular velocity indicating that the motor 21 is stopping and is set to substantially zero. The second angular velocity threshold value $\omega th2$ is an angular velocity indicating that the motor 21 is rotating at a low speed and is set to an appropriate value which is greater than zero. The angular velocity change threshold value $\Delta\omega th$ is a change in angular velocity indicating that the motor 21 is not substantially accelerating nor decelerating and is set to a value which is slightly greater than zero.

A process routine of acquiring a limit position determination angle $\theta i$ which is performed by the limit position determination angle acquiring unit 93 will be described below. In the following description, for the purpose of convenience of description, it is assumed that the rack shaft 12 moves to the right side and limit position determination angles $\theta i$ on the right side are acquired, but the same process is also performed when the rack shaft 12 moves to the left side and limit position determination angles $\theta i$ on the left side are acquired.

Figure 5:
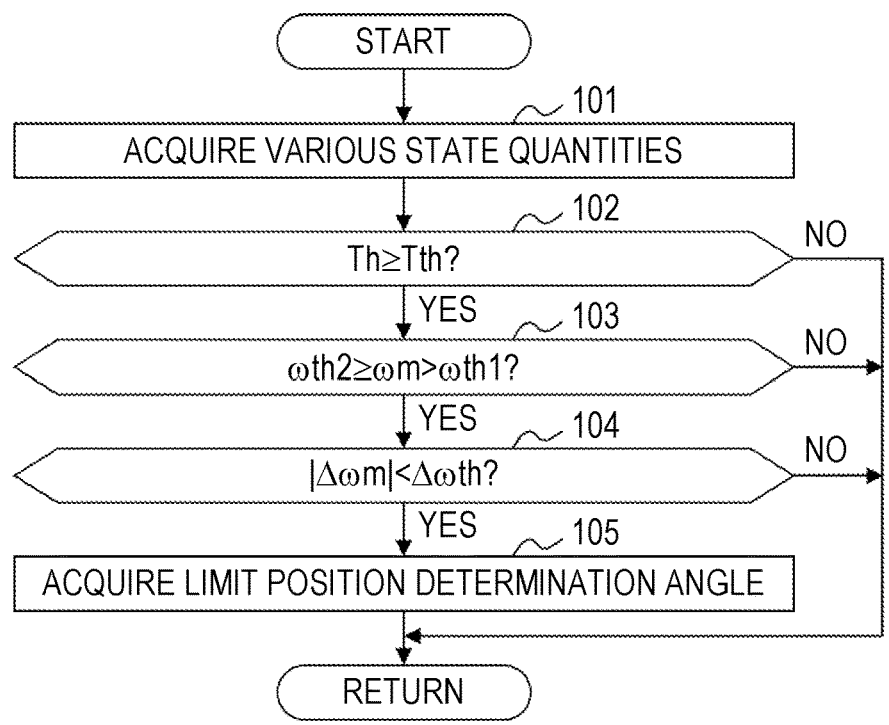
FIG. 5 is a flowchart illustrating a process routine of acquiring a limit position determination angle which is performed by a limit position determination angle acquiring unit.

As illustrated in the flowchart of FIG. 5, when various state quantities are acquired (Step 101), the limit position determination angle acquiring unit 93 determines whether the steering torque Th is equal to or greater than the steering torque threshold value Tth (Step 102). When the steering torque Th is equal to or greater than the steering torque threshold value Tth (Step 102: YES), the limit position determination angle acquiring unit 93 determines whether the motor angular velocity $\omega m$ is greater than the first angular velocity threshold value $\omega th1$ and equal to or less than the second angular velocity threshold value $\omega th2$ (Step 103). That is, in Step 103, it is determined whether the sign of the motor angular velocity $\omega m$ is the same as the sign of the steering torque Th and the absolute value of the motor angular velocity $\omega m$ is greater than the first angular velocity threshold value $\omega th1$ and equal to or less than the second angular velocity threshold value $\omega th2$. When the motor angular velocity $\omega m$ is greater than the first angular velocity threshold value $\omega th1$ and equal to or less than the second angular velocity threshold value $\omega th2$ (Step 103: YES), the limit position determination angle acquiring unit 93 determines whether the absolute value of the angular velocity change $\Delta\omega m$ is less than the angular velocity change threshold value $\Delta\omega th$ (Step 104). When the absolute value of the angular velocity change $\Delta\omega m$ is less than the angular velocity change threshold value $\Delta\omega th$ (Step 104: YES), the limit position determination angle acquiring unit 93 determines that movement of the rack shaft 12 has been limited and acquires the absolute steering angle $\theta s$ acquired in the same calculation cycle as a limit position determination angle $\theta i$ (Step 105).

On the other hand, when the steering torque Th is less than the steering torque threshold value Tth (Step 102: NO), when the motor angular velocity $\omega m$ is equal to or less than the first angular velocity threshold value $\omega th1$ or greater than the second angular velocity threshold value $\omega th2$ (Step 103: NO), or when the absolute value of the angular velocity change $\Delta\omega m$ is equal to or greater than the angular velocity change threshold value $\Delta\omega th$ (Step 104: NO), the limit position determination angle acquiring unit 93 does not perform the processes subsequent thereto.

End-Position-Corresponding Angle Setting Unit 94

A plurality of limit position determination angles $\theta i$ from the limit position determination angle acquiring unit 93 is input to the end-position-corresponding angle setting unit 94. When the limit position determination angles $\theta i$ on the right and left sides are acquired, the end-position-corresponding angle setting unit 94 sets the end-position-corresponding angles θs_re and θs_le based on the limit position determination angles θi on the right and left sides. The end-position-corresponding angle setting unit 94 determines on which of the right and left sides the limit position determination angle θi is based on the sign of the limit position determination angle θi. In the following description, the end-position-corresponding angles θs_re and θs_le may be simply referred to as end-position-corresponding angles θs_e when the signs are not specified as the right or left side.

Specifically, when the limit position determination angles θi on both the right and left sides are acquired, the end-position-corresponding angle setting unit 94 first calculates a first stroke width Ws1 which is a sum of the absolute value of the limit position determination angle θi on the right side and the absolute value of the limit position determination angle θi on the left side. When the first stroke width Ws1 is greater than a first stroke threshold value Wth1 which is a stroke threshold value and less than a second stroke threshold value Wth2, the end-position-corresponding angle setting unit 94 sets the acquired limit position determination angles θi on the right and left sides as the end-position-corresponding angles θs_re and θs_le without any change. The first stroke threshold value Wth1 is an angle range which is expressed by the absolute steering angle θs and is set to a range which is slightly less than an angle range corresponding to an entire stroke range of the rack shaft 12. The second stroke threshold value Wth2 is an angle range which is expressed by the absolute steering angle θs and is set to a range which is slightly greater than the angle range corresponding to the entire stroke range of the rack shaft 12. When the first stroke width Ws1 is equal to or less than the first stroke threshold value Wth1 or when the first stroke width Ws1 is equal to or greater than the second stroke threshold value Wth2, the end-position-corresponding angle setting unit 94 does not set the end-position-corresponding angles θs_re and θs_le and discards the input limit position determination angles θi.

On the other hand, when a plurality of limit position determination angles θi on only one side is acquired, the end-position-corresponding angle setting unit 94 calculates a center separation angle θd indicating a distance between each limit position determination angle θi and the vehicle center angle θc. When the center separation angle θd for each limit position determination angle θi is greater than an end position determination threshold value θth, the end-position-corresponding angle setting unit 94 sets only the end-position-corresponding angle θs_e on the corresponding side based on the plurality of limit position determination angles θi. Specifically, the end-position-corresponding angle setting unit 94 sets an average value of the plurality of limit position determination angles θi as the end-position-corresponding angle θs_e on the corresponding side. The end position determination threshold value θth is a threshold value for determining whether a limit position determination angle θi is close to the rack end position and is set in advance to a value indicating a range which is slightly less than a half of a rotatable range of the steering shaft 11. On the other hand, when the center separation angle θd is equal to or less than the end position determination threshold value θth, the end-position-corresponding angle setting unit 94 discards the plurality of limit position determination angles θi on the one side.

When a limit position determination angle θi on the other side is acquired after the end-position-corresponding angle θs_e on only the one side has been set, the end-position-corresponding angle setting unit 94 sets the end-position-corresponding angle θs_e on the other side based on the acquired limit position determination angle θi.

Specifically, when only the end-position-corresponding angle θs_e on the one side is set and a limit position determination angle θi on the other side is acquired, the end-position-corresponding angle setting unit 94 calculates the second stroke width Ws2. The second stroke width Ws2 is a sum of the absolute value of a value based on a plurality of limit position determination angles θi on the one side and the absolute value of the limit position determination angle θi on the other side, and a sum of the absolute value of the end-position-corresponding angle θs_e on the one side and the absolute value of the limit position determination angle θi on the other side is calculated as the second stroke width Ws2 in this embodiment. When the second stroke width Ws2 is greater than the first stroke threshold value Wth1 and less than the second stroke threshold value Wth2, the end-position-corresponding angle setting unit 94 sets the acquired limit position determination angle θi on the other side as the end-position-corresponding angle θs_e on the other side without any change. On the other hand, when the second stroke width Ws2 is equal to or less than the first stroke threshold value Wth1 or when the second stroke width Ws2 is equal to or greater than the second stroke threshold value Wth2, the end-position-corresponding angle setting unit 94 discards the end-position-corresponding angle θs_e on the one side and the limit position determination angle θi on the other side.

For example, it can be assumed that only the end-position-corresponding angle θs_le on the left side is set. In this case, when a limit position determination angle θi on the right side is acquired, the end-position-corresponding angle setting unit 94 calculates a sum of the absolute value of the limit position determination angle θi on the right side and the absolute value of the end-position-corresponding angle θs_le on the left side as the second stroke width Ws2. When the second stroke width Ws2 is greater than the first stroke threshold value Wth1 and less than the second stroke threshold value Wth2, the end-position-corresponding angle setting unit 94 sets the acquired limit position determination angle θi on the right side as the end-position-corresponding angle θs_re on the right side without any change. On the other hand, when the second stroke width Ws2 is equal to or less than the first stroke threshold value Wth1 or when the second stroke width Ws2 is equal to or greater than the second stroke threshold value Wth2, the end-position-corresponding angle setting unit 94 discards the end-position-corresponding angle θs_le on the left side and the limit position determination angle θi on the right side.

Figure 6:
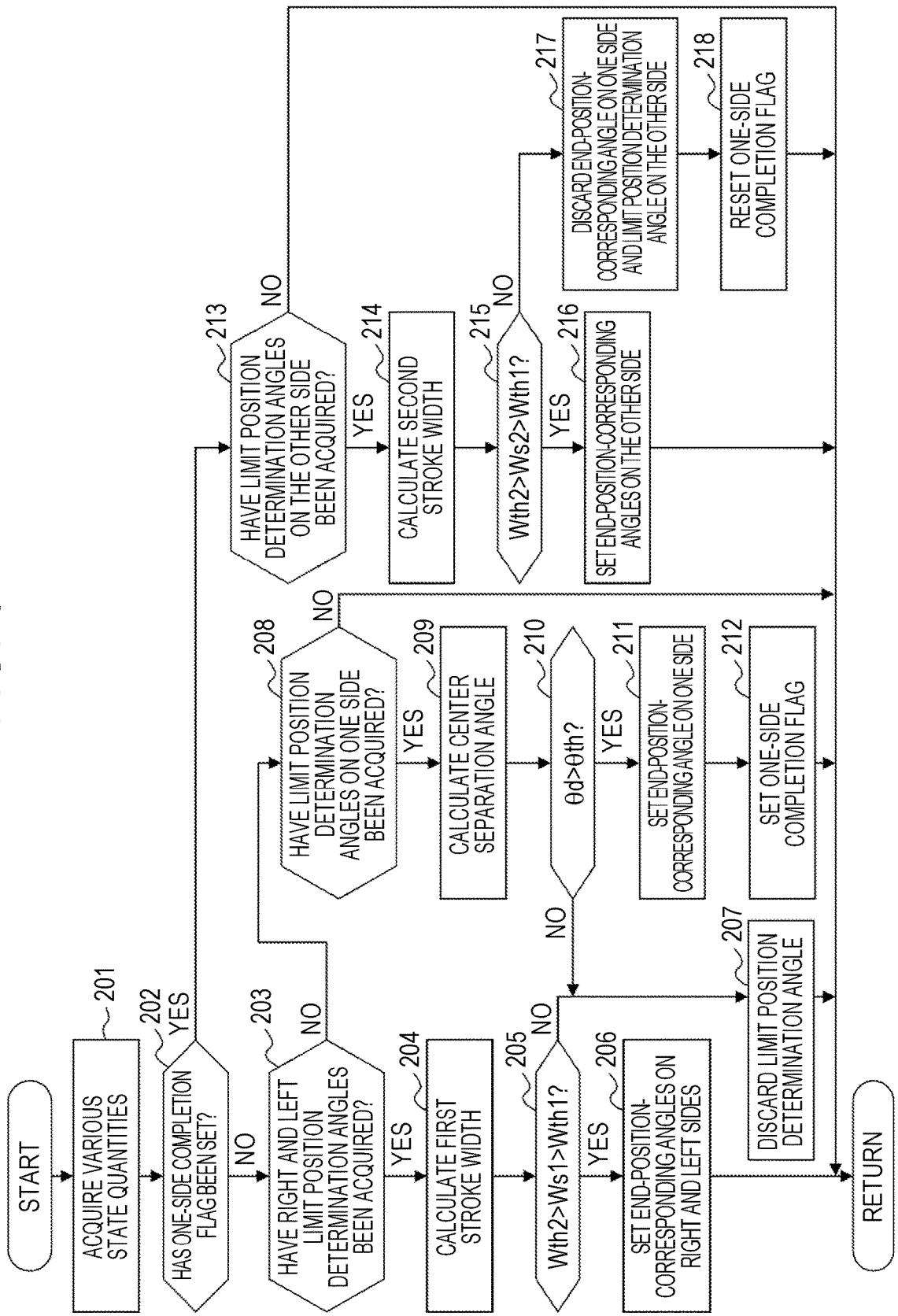
FIG. 6 is a flowchart illustrating a process routine of setting an end-position-corresponding angle which is performed by an end-position-corresponding angle setting unit.

A process routine of setting an end-position-corresponding angle θs_e which is performed by the end-position-corresponding angle setting unit 94 will be described below. As illustrated in the flowchart of FIG. 6, when various state quantities are acquired (Step 201), the end-position-corresponding angle setting unit 94 determines whether a one-side completion flag indicating that only the end-position-corresponding angle θs_e on one side is set in the memory 64 has been set up (Step 202).

When the one-side completion flag is not set up (Step 202: NO), the end-position-corresponding angle setting unit 94 determines whether limit position determination angles θi on the right and left sides have been acquired (Step 203), and calculates the first stroke width Ws1 (Step 204) when the limit position determination angles θi on the right and left sides have been acquired (Step 203: YES). Subsequently, the end-position-corresponding angle setting unit 94 determines whether the first stroke width Ws1 is greater than the first stroke threshold value Wth1 and less than the second stroke threshold value Wth2 (Step 205). When the first stroke width Ws1 is greater than the first stroke threshold value Wth1 and less than the second stroke threshold value Wth2 (Step 205: YES), the end-position-corresponding angle setting unit 94 sets the limit position determination angles θi on the right and left sides which are used to calculate the first stroke width Ws1 as the end-position-corresponding angles θs_re and θs_le (Step 206). When the first stroke width Ws1 is equal to or less than the first stroke threshold value Wth1 or when the first stroke width Ws1 is equal to or greater than the second stroke threshold value Wth2 (Step 205: NO), the end-position-corresponding angle setting unit 94 discards the acquired limit position determination angles θi (Step 207).

On the other hand, when none of the limit position determination angles θi on the right and left sides has not been acquired (Step 203: NO), the end-position-corresponding angle setting unit 94 determines whether a plurality of limit position determination angles θi on one side has been acquired (Step 208). When a plurality of limit position determination angles θi on one side has been acquired (Step 208: YES), the end-position-corresponding angle setting unit 94 calculates the center separation angle θd for each limit position determination angle θi (Step 209) and determines whether each center separation angle θd is greater than the end position determination threshold value θth (Step 210). When each center separation angle θd is greater than the end position determination threshold value θth (Step 210: YES), the end-position-corresponding angle setting unit 94 sets the end-position-corresponding angle θs_e on the one side based on the plurality of limit position determination angles θi (Step 211) and sets up the one-side completion flag (Step 212).

When a plurality of limit position determination angles θi on one side has not been acquired (Step 208: NO), the end-position-corresponding angle setting unit 94 does not perform the processes subsequent thereto. When at least one of the center separation angles θd is equal to or less than the end position determination threshold value θth (Step 210: NO), the end-position-corresponding angle setting unit 94 discards the acquired limit position determination angles θi in Step 207.

When the one-side completion flag is set up (Step 202: YES), the end-position-corresponding angle setting unit 94 determines whether a limit position determination angle θi on the other side has been acquired (Step 213). When a limit position determination angle θi on the other side has been acquired (Step 213: YES), the end-position-corresponding angle setting unit 94 calculates the second stroke width Ws2 (Step 214), and determines whether the second stroke width Ws2 is greater than the first stroke threshold value Wth1 and less than the second stroke threshold value Wth2 (Step 215). When the second stroke width Ws2 is greater than the first stroke threshold value Wth1 and less than the second stroke threshold value Wth2 (Step 215: YES), the end-position-corresponding angle setting unit 94 sets the limit position determination angle θi on the other side as the end-position-corresponding angle θs_e on the corresponding side (Step 216).

On the other hand, when the second stroke width Ws2 is equal to or less than the first stroke threshold value Wth1 or when the second stroke width Ws2 is equal to or greater than the second stroke threshold value Wth2 (Step 215: NO), the end-position-corresponding angle setting unit 94 discards the end-position-corresponding angle θs_e on the one side set in Step 211 and the limit position determination angle θi on the other side (Step 217) and resets the one-side completion flag (Step 218). When a limit position determination angle θi on the other side has not been acquired (Step 213: NO), the end-position-corresponding angle setting unit 94 does not perform the processes subsequent thereto.

Operations and advantageous effects of this embodiment will be described below. For example, when movement of the rack shaft 12 has been limited due to contact of the turning wheels 4 with a curbstone or the like, the absolute value of a limit position determination angle θi acquired at this time is less than the absolute value of a limit position determination angle θi acquired at the time of an end contact. Accordingly, when the limit position determination angle θi on at least one of the right and left sides has been acquired, for example, at the time of contact with a curbstone, the first stroke width Ws1 is equal to or less than the first stroke threshold value Wth1. When the acquired limit position determination angle θi is normal, the first stroke width Ws1 is less than the second stroke threshold value Wth2. Accordingly, when the first stroke width Ws1 is greater than the first stroke threshold value Wth1 and less than the second stroke threshold value Wth2, it is thought that the limit position determination angles θi on the right and left sides have been acquired at the time of an end contact.

Taking this point into consideration, when the limit position determination angles θi on the right and left sides have been acquired, the end-position-corresponding angle setting unit 94 in this embodiment compares the first stroke width Ws1 with the first stroke threshold value Wth1 and the second stroke threshold value Wth2. When the first stroke width Ws1 is greater than the first stroke threshold value Wth1 and less than the second stroke threshold value Wth2, the end-position-corresponding angle setting unit 94 sets the end-position-corresponding angles θs_re and θs_le on the right and left sides based on the limit position determination angles θi on the right and left sides which are used to calculate the first stroke width Ws1. Accordingly, the set end-position-corresponding angles θs_re and θs_le on the right and left sides accurately correspond to an actual rack end angle which is an actual end angle at which an end contact actually occurs. When one limit position determination angle θi on each of the right and left sides has been acquired, the first stroke width Ws1 can be calculated and thus it is possible to rapidly set the end-position-corresponding angles θs_re and θs_le on the right and left sides without waiting until a plurality of limit position determination angles θi on the right and left sides has been acquired.

When a plurality of limit position determination angles θi on only one side has been acquired and each center separation angle θd is greater than the end position determination threshold value θth, the end-position-corresponding angle setting unit 94 sets only the end-position-corresponding angle θs_e on the one side based on the plurality of limit position determination angles θi on the one side. Accordingly, for example, even when only the limit position determination angle θi on the one side has been acquired due to a traveling situation of the vehicle or the like, it is possible to set the end-position-corresponding angle θs_e on the one side.

When each center separation angle θd is greater than the end position determination threshold value θth, it is thought that the plurality of limit position determination angles θi on the one side is angles close to the actual rack end angle. Accordingly, as in this embodiment, when each center separation angle θd is greater than the end position determination threshold value θth, it is possible to prevent the end-position-corresponding angle θs_e from being shifted from the actual rack end position by setting only the end-position-corresponding angle θs_e on the one side based on the plurality of limit position determination angles θi on the one side.

When the limit position determination angle θi on the other side is acquired after only the end-position-corresponding angle θs_e on one side has been set, the end-position-corresponding angle setting unit 94 calculates the second stroke width Ws2. When the second stroke width Ws2 is greater than the first stroke threshold value Wth1 and less than the second stroke threshold value Wth2, the end-position-corresponding angle setting unit 94 sets the end-position-corresponding angle θs_e on the other side based on the limit position determination angle θi on the other side. In this way, by comparing the second stroke width Ws2 with the first stroke threshold value Wth1 and the second stroke threshold value Wth2, it is possible to rapidly set the end-position-corresponding angle θs_e on the other side which accurately corresponds to the actual rack end angle without waiting until a plurality of limit position determination angles θi on the other side has been acquired.

When the limit position determination angle θi on the other side is acquired after only the end-position-corresponding angle θs_e on one side has been set, the end-position-corresponding angle setting unit 94 calculates the second stroke width Ws2. When the second stroke width Ws2 is equal to or less than the first stroke threshold value Wth1 or equal to or greater than the second stroke threshold value Wth2, the end-position-corresponding angle setting unit 94 discards the end-position-corresponding angle θs_e on the one side.

When the second stroke width Ws2 is equal to or less than the first stroke threshold value Wth1 or equal to or greater than the second stroke threshold value Wth2, there is a likelihood that the set end-position-corresponding angle θs_e on the one side will have been greatly separated from the actual rack end angle. Accordingly, in this embodiment, by discarding the end-position-corresponding angle θs_e on the one side when the second stroke width Ws2 is equal to or less than the first stroke threshold value Wth1 or equal to or greater than the second stroke threshold value Wth2, it is possible to set the end-position-corresponding angle θs_e again and to set the end-position-corresponding angles θs_re and θs_le which accurately correspond to the actual rack end angle.

The above embodiments can be modified as follows. The above embodiments and the following modified examples can be combined unless technical confliction arises. In the embodiments, when the limit position determination angles θi on the right and left sides have been acquired, the first stroke width Ws1 is compared with the first stroke threshold value Wth1 and the second stroke threshold value Wth2. However, the disclosure is not limited thereto and the first stroke width Ws1 may be compared with only the first stroke threshold value Wth1 and the end-position-corresponding angles θs_re and θs_le on the right and left sides may be set based on the limit position determination angles θi on the right and left sides when the first stroke width Ws1 is greater than the first stroke threshold value Wth1.

In the embodiments, when the limit position determination angle θi on the other side is acquired after only the end-position-corresponding angle θs_e on the one side has been set, the second stroke width Ws2 is compared with the first stroke threshold value Wth1 and the second stroke threshold value Wth2. However, the disclosure is not limited thereto and the second stroke width Ws2 may be compared with only the first stroke threshold value Wth1 and the end-position-corresponding angle θs_e on the other side may be set based on the limit position determination angle θi on the other side when the second stroke width Ws2 is greater than the first stroke threshold value Wth1.

In the above embodiment, the end-position-corresponding angle θs_e on one side is used as a value based on a plurality of limit position determination angles θi, on the one side which is used to calculate the second stroke width Ws2, but the disclosure is not limited thereto and, for example, the limit position determination angle θi having the largest absolute value out of the plurality of limit position determination angles θi on the one side may be used.

In the above embodiment, when the second stroke width Ws2 is equal to or less than the first stroke threshold value Wth1 or equal to or greater than the second stroke threshold value Wth2, the end-position-corresponding angle θs_e on the one side may not be discarded but only the limit position determination angle θi on the other side may be discarded.

In the embodiment, instead of comparing the second stroke width Ws2 with the first stroke threshold value Wth1 and the second stroke threshold value Wth2 after only the end-position-corresponding angle θs_e on the one side has been set, a plurality of limit position determination angles θi on the other side may be acquired and then the end-position-corresponding angle θs_e on the other side may be set based thereon.

In the embodiment, instead of comparing each center separation angle θd with the end position determination threshold value eth, the end-position-corresponding angle θs_e on the one side may be set based on a plurality of limit position determination angles θi on the one side. In this case, it is preferable that the end-position-corresponding angle θs_e be set based on a larger number of limit position determination angles θi than that in a case in which each center separation angle θd is compared with the end position determination threshold value θth.

In the embodiment, it is determined whether the vehicle is traveling forward based on the yaw rate γ, but the disclosure is not limited thereto and it may be determined whether the vehicle is traveling forward, for example, based on a wheel speed difference between the right and left sides or the like. The method of determination can be appropriately modified.

In the embodiment, when a plurality of limit position determination angles θi on only one side has been acquired, only the end-position-corresponding angle θs_e on the one side is set based thereon, but the disclosure is not limited thereto. The end-position-corresponding angles θs_re and θs_le may not be set until the limit position determination angles θi on the right and left sides have been acquired.

In the embodiment, the conditions for determining whether movement of the rack shaft 12 has been limited can be appropriately modified. For example, when the conditions (a1) and (a3) are satisfied, it may be determined that movement of the rack shaft 12 has been limited even if the condition (a2) is not satisfied.

In the embodiment, the absolute steering angle θs when it is determined that movement of the rack shaft 12 has been limited is acquired as the limit position determination angle θi. However, the disclosure is not limited thereto and, for example, a value obtained by performing rigidity compensation based on mechanical elastic deformation of the EPS 2 which is caused due to a torque applied to the EPS 2 when it is determined that movement of the rack shaft 12 has been limited on the absolute steering angle θs may be acquired as the limit position determination angle θi.

In the embodiment, when a plurality of limit position determination angles θi on only one side has been acquired, an average value thereof is set as the end-position-corresponding angle θs_e on the one side. However, the disclosure is not limited thereto and, for example, the limit position determination angle θi having the largest absolute angle out of the plurality of limit position determination angles θi on the one side may be set as the end-position-corresponding angle θs_e on the one side.

In the embodiments, by monitoring the rotation of the motor 21 even when the ignition switch is turned off, the rotation speed of the motor 21 from the origin is normally integrated, and the absolute motor angle and the absolute steering angle θs are detected. However, the disclosure is not limited thereto and, for example, a steering sensor that detects a steering angle as an absolute angle may be provided, the rotation speed of the motor 21 from the origin may be integrated based on the steering angle detected by the steering sensor and the reduction gear ratio of the reduction gear mechanism 22, and the absolute motor angle and the absolute steering angle θs may be detected.

In the embodiments, end contact relaxation control is performed by limiting the assist command value Ias* to the steering angle limit value Ien, but the disclosure is not limited thereto and end contact relaxation control may be performed, for example, by adding a steering reaction component increasing as it approaches the rack end position, that is, a component with a sign opposite to the sign of the assist command value Ias*, to the assist command value Ias*.

In the embodiments, a guard process is performed on the assist command value Ias*, but the disclosure is not limited thereto and, for example, the guard process may be performed on a value obtained by correcting the assist command value Ias* using a compensation value based on a torque differential value obtained by differentiating the steering torque Th.

In the embodiments, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ien as the limit value Ig without any change may be employed.

In the embodiments, a value obtained by subtracting the angle limiting component Iga from the rated current Ir is used as the steering angle limit value Ien, but the disclosure is not limited thereto and a value obtained by subtracting the angle limiting component Iga and an amount of current limitation which is determined by the motor angular velocity from the rated current Ir may be used as the steering angle limit value Ien.

In the embodiments, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. Not limited to the EPS, the steering control device 1 may control a steer-by-wire type steering device in which transmission of power between a steering unit which is operated by a driver and a turning unit that turns the turning wheels is cut off and end contact relaxation control may be performed on a torque command value or a q-axis current command value of a motor of a turning actuator which is provided in the turning unit as in this embodiment.

What is claimed is:

1. A steering control device for a steering system including a housing, a turning shaft which is accommodated in the housing such that the turning shaft is able to reciprocate, and an actuator which applies a motor torque for causing the turning shaft to reciprocate using a motor as a drive source, the steering control device comprising an electronic control unit configured to:

detect an absolute steering angle which is a rotation angle of a rotation shaft which is able to be converted into a turning angle of turning wheels connected to the turning shaft and which is expressed as an absolute angle including a range exceeding 360°;

determine whether movement of the turning shaft is limited and acquire a limit position determination angle corresponding to the absolute steering angle when it is determined that movement of the turning shaft is limited; and compare a first stroke width which is a sum of an absolute value of the limit position determination angle on a right side and an absolute value of the limit position determination angle on a left side with a stroke threshold value corresponding to an entire stroke range of the turning shaft when an angle which indicates that the turning shaft is located at an end position and which is correlated with the absolute steering angle is defined as an end-position-corresponding angle and the limit position determination angles on the right and left sides are acquired, and set the end-position-corresponding angles on the right and left sides in a memory based on the limit position determination angles on the right and left sides when the first stroke width is greater than the stroke threshold value;

wherein the set end-position-corresponding angles on the right and left sides are angles at which movement of the turning shaft is physically limited by contact with the housing, wherein the limit position determination angles on the right and left sides are less than the set end-position-corresponding angles on the right and left sides, respectively, when movement of the turning shaft is not physically limited by contact with the housing, and wherein the stroke threshold value is an angle range that is less than an angle at which movement of the turning shaft is physically limited by contact with the housing.

2. The steering control device according to claim 1, wherein the electronic control unit is configured to set the end-position-corresponding angle on only one side of the right and left sides based on a plurality of limit position determination angles on the one side when the plurality of limit position determination angles on only the one side is acquired.

3. The steering control device according to claim 2, wherein, when distances between the plurality of limit position determination angles on the one side and a vehicle center angle indicating the absolute steering angle at which a vehicle travels forward are defined as center separation angles, the electronic control unit is configured to set only the end-position-corresponding angle on the one side based on the plurality of limit position determination angles on the one side when the center separation angles are greater than a preset end position determination threshold value.

4. The steering control device according to claim 2, wherein, when the limit position determination angle on the other side of the right and left sides is acquired after only the end-position-corresponding angle on the one side has been set, the electronic control unit is configured to compare a second stroke width which is a sum of an absolute value of a value based on the plurality of limit position determination angles on the one side and an absolute value of the limit position determination angle on the other side with the stroke threshold value and to set the end-position-corresponding angle on the other side based on the limit position determination angle on the other side when the second stroke width is greater than the stroke threshold value.

5. The steering control device according to claim 2, wherein, when the limit position determination angle on the other side of the right and left sides is acquired after only the end-position-corresponding angle on the one side has been set, the electronic control unit is configured to compare a second stroke width which is a sum of an absolute value of a value based on the plurality of limit position determination angles on the one side and an absolute value of the limit position determination angle on the other side with the stroke threshold value and to discard the end-position-corresponding angle on the one side when the second stroke width is equal to or less than the stroke threshold value.

* * * * *